United States Patent
Sanvido et al.

(10) Patent No.: US 10,248,516 B1
(45) Date of Patent: Apr. 2, 2019

(54) PROCESSING READ AND WRITE REQUESTS DURING RECONSTRUCTION IN A STORAGE SYSTEM

(71) Applicant: Pure Storage, Inc., Mountain View, CA (US)

(72) Inventors: Marco Sanvido, Belmont, CA (US); Richard Hankins, San Jose, CA (US); Naveen Neelakantam, Mountain View, CA (US); Xiaohui Wang, San Jose, CA (US); Mark McAuliffe, East Palo Alto, CA (US); Taher Vohra, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 182 days.

(21) Appl. No.: 15/416,151

(22) Filed: Jan. 26, 2017

Related U.S. Application Data

(63) Continuation of application No. 14/567,960, filed on Dec. 11, 2014, now Pat. No. 9,588,842.

(51) Int. Cl.
*G06F 11/00* (2006.01)
*G06F 11/20* (2006.01)
*G06F 11/10* (2006.01)

(52) U.S. Cl.
CPC ........ *G06F 11/2094* (2013.01); *G06F 11/108* (2013.01); *G06F 11/1088* (2013.01);
(Continued)

(58) Field of Classification Search
CPC . G06F 11/108; G06F 11/1088; G06F 11/1092
See application file for complete search history.

(56) References Cited

U.S. PATENT DOCUMENTS

| 5,208,813 A | 5/1993 | Stallmo |
|---|---|---|
| 5,403,639 A | 4/1995 | Belsan |

(Continued)

FOREIGN PATENT DOCUMENTS

| CN | 103370685 A | 10/2013 |
|---|---|---|
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Philip Guyton
(74) *Attorney, Agent, or Firm* — Kennedy Lenart Spraggins LLP

(57) ABSTRACT

A system and method for efficiently distributing data among multiple storage devices. A data storage array receives read and write requests from multiple client computers. The data storage array includes multiple storage devices, each with multiple allocation units (AUs). A storage controller within the data storage array determines a RAID layout for use in storing data. In response to determining a failure of a first AU, the storage controller begins reconstructing in a second AU the data stored in the first AU. For read and write requests targeting data in the first AU, the request is serviced by the first AU responsive to determining no error occurs when accessing the first AU.

15 Claims, 6 Drawing Sheets

(52) U.S. Cl.
CPC .... *G06F 11/1092* (2013.01); *G06F 2201/805* (2013.01); *G06F 2201/82* (2013.01)

(56) References Cited

U.S. PATENT DOCUMENTS

| | | | |
|---|---|---|---|
| 5,802,264 A * | 9/1998 | Chen | G06F 11/1084 714/6.12 |
| 5,940,838 A | 8/1999 | Schmuck et al. | |
| 6,263,350 B1 | 7/2001 | Wollrath et al. | |
| 6,412,045 B1 | 6/2002 | DeKoning et al. | |
| 6,718,448 B1 | 4/2004 | Ofer | |
| 6,757,769 B1 | 6/2004 | Ofer | |
| 6,799,283 B1 | 9/2004 | Masaaki et al. | |
| 6,834,298 B1 | 12/2004 | Singer et al. | |
| 6,850,938 B1 | 2/2005 | Sadjadi | |
| 6,915,434 B1 | 7/2005 | Kuroda | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,216,164 B1 | 5/2007 | Whitmore et al. | |
| 7,783,682 B1 | 8/2010 | Patterson | |
| 7,873,619 B1 | 1/2011 | Faibish et al. | |
| 7,913,300 B1 | 3/2011 | Flank et al. | |
| 7,933,936 B2 | 4/2011 | Aggarwal et al. | |
| 7,979,613 B2 | 7/2011 | Zohar et al. | |
| 8,086,652 B1 | 12/2011 | Bisson et al. | |
| 8,117,464 B1 | 2/2012 | Kogelnik | |
| 8,205,065 B2 | 6/2012 | Matze | |
| 8,352,540 B2 | 1/2013 | Anglin et al. | |
| 8,527,544 B1 | 9/2013 | Colgrove et al. | |
| 8,560,747 B1 | 10/2013 | Tan et al. | |
| 8,621,241 B1 | 12/2013 | Stephenson | |
| 8,700,875 B1 | 4/2014 | Barron et al. | |
| 8,751,463 B1 | 6/2014 | Chamness | |
| 8,806,160 B2 | 8/2014 | Colgrove et al. | |
| 8,874,850 B1 | 10/2014 | Goodson et al. | |
| 8,959,305 B1 | 2/2015 | Lecrone et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 9,552,248 B2 | 1/2017 | Miller et al. | |
| 2002/0038436 A1 | 3/2002 | Suzuki | |
| 2002/0087544 A1 | 7/2002 | Selkirk et al. | |
| 2002/0178335 A1 | 11/2002 | Selkirk et al. | |
| 2003/0140209 A1 | 7/2003 | Testardi | |
| 2004/0049572 A1 | 3/2004 | Yamamoto et al. | |
| 2005/0066095 A1 | 3/2005 | Mullick et al. | |
| 2005/0216535 A1 | 9/2005 | Saika et al. | |
| 2005/0223154 A1 | 10/2005 | Uemura | |
| 2006/0074940 A1 | 4/2006 | Craft et al. | |
| 2006/0136365 A1 | 6/2006 | Kedem et al. | |
| 2006/0155946 A1 | 7/2006 | Ji | |
| 2007/0067585 A1 | 3/2007 | Ueda et al. | |
| 2007/0162954 A1 | 7/2007 | Pela | |
| 2007/0171562 A1 | 7/2007 | Maejima et al. | |
| 2007/0174673 A1 | 7/2007 | Kawaguchi et al. | |
| 2007/0220313 A1 * | 9/2007 | Katsuragi | G06F 11/0727 714/6.22 |
| 2007/0245090 A1 | 10/2007 | King et al. | |
| 2007/0266179 A1 | 11/2007 | Chavan et al. | |
| 2008/0059699 A1 | 3/2008 | Kubo et al. | |
| 2008/0065852 A1 | 3/2008 | Moore et al. | |
| 2008/0134174 A1 | 6/2008 | Sheu et al. | |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0244205 A1 | 10/2008 | Amano et al. | |
| 2008/0275928 A1 | 11/2008 | Shuster | |
| 2008/0285083 A1 | 11/2008 | Aonuma | |
| 2008/0307270 A1 | 12/2008 | Li | |
| 2009/0006587 A1 | 1/2009 | Richter | |
| 2009/0037662 A1 | 2/2009 | La Frese et al. | |
| 2009/0204858 A1 | 8/2009 | Kawaba | |
| 2009/0228648 A1 | 9/2009 | Wack | |
| 2009/0300084 A1 | 12/2009 | Whitehouse | |
| 2010/0057673 A1 | 3/2010 | Savov | |
| 2010/0058026 A1 | 3/2010 | Heil et al. | |
| 2010/0067706 A1 | 3/2010 | Anan et al. | |
| 2010/0077205 A1 | 3/2010 | Ekstrom et al. | |
| 2010/0082879 A1 | 4/2010 | McKean et al. | |
| 2010/0106905 A1 | 4/2010 | Kurashige et al. | |
| 2010/0153620 A1 | 6/2010 | McKean et al. | |
| 2010/0153641 A1 | 6/2010 | Jagadish et al. | |
| 2010/0191897 A1 | 7/2010 | Zhang et al. | |
| 2010/0250802 A1 | 9/2010 | Waugh et al. | |
| 2010/0250882 A1 | 9/2010 | Hutchison et al. | |
| 2010/0281225 A1 | 11/2010 | Chen et al. | |
| 2010/0287327 A1 | 11/2010 | Li et al. | |
| 2011/0072300 A1 | 3/2011 | Rousseau | |
| 2011/0145598 A1 | 6/2011 | Smith et al. | |
| 2011/0161559 A1 | 6/2011 | Yurzola et al. | |
| 2011/0167221 A1 | 7/2011 | Pangal et al. | |
| 2011/0238634 A1 | 9/2011 | Kobara | |
| 2012/0023375 A1 | 1/2012 | Dutta et al. | |
| 2012/0036309 A1 | 2/2012 | Dillow et al. | |
| 2012/0117029 A1 | 5/2012 | Gold | |
| 2012/0198175 A1 | 8/2012 | Atkisson | |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 * | 2/2013 | Ikeuchi | G06F 11/14 714/6.22 |
| 2013/0091102 A1 | 4/2013 | Nayak | |
| 2013/0205110 A1 | 8/2013 | Kettner | |
| 2013/0227236 A1 | 8/2013 | Flynn et al. | |
| 2013/0275391 A1 | 10/2013 | Batwara et al. | |
| 2013/0275656 A1 | 10/2013 | Talagala et al. | |
| 2013/0283058 A1 | 10/2013 | Fiske et al. | |
| 2013/0290648 A1 | 10/2013 | Shao et al. | |
| 2013/0318314 A1 | 11/2013 | Markus et al. | |
| 2013/0339303 A1 | 12/2013 | Potter et al. | |
| 2014/0052946 A1 | 2/2014 | Kimmel | |
| 2014/0068791 A1 | 3/2014 | Resch | |
| 2014/0089730 A1 | 3/2014 | Watanabe et al. | |
| 2014/0101361 A1 | 4/2014 | Gschwind | |
| 2014/0143517 A1 | 5/2014 | Jin et al. | |
| 2014/0172929 A1 | 6/2014 | Sedayao et al. | |
| 2014/0201150 A1 | 7/2014 | Kumarasamy et al. | |
| 2014/0215129 A1 | 7/2014 | Kuzmin et al. | |
| 2014/0229131 A1 | 8/2014 | Cohen et al. | |
| 2014/0229452 A1 | 8/2014 | Serita et al. | |
| 2014/0281308 A1 | 9/2014 | Lango et al. | |
| 2014/0325115 A1 | 10/2014 | Ramsundar et al. | |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2016/0019114 A1 | 1/2016 | Han et al. | |
| 2016/0098191 A1 | 4/2016 | Golden et al. | |
| 2016/0098199 A1 | 4/2016 | Golden et al. | |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |

(56) References Cited

FOREIGN PATENT DOCUMENTS

WO  WO-2008/102347 A1  8/2008
WO  WO-2010/071655 A1  6/2010

OTHER PUBLICATIONS

Microsoft Corporation, "Fundamentals of Garbage Collection", Retrieved Aug. 30, 2013 via the WayBack Machine, 11 pages.

* cited by examiner

PROCESSING READ AND WRITE REQUESTS DURING RECONSTRUCTION IN A STORAGE SYSTEM

CROSS-REFERENCE TO RELATED APPLICATION

This application is a continuation application of and claims priority from U.S. patent application Ser. No. 14/567,960, filed Dec. 11, 2014.

TECHNICAL FIELD

This invention relates to computer networks and, more particularly, to efficiently distributing data among multiple storage devices.

BACKGROUND ART

As computer memory storage and data bandwidth increase, so does the amount and complexity of data that businesses daily manage. Large-scale distributed storage systems, such as data centers, typically run many business operations. A distributed storage system may be coupled to client computers interconnected by one or more networks. If any portion of the distributed storage system has poor performance or becomes unavailable, company operations may be impaired or stopped completely. A distributed storage system therefore is expected to maintain high standards for data availability and high-performance functionality. As used herein, storage disks may be referred to as storage devices as some types of storage technologies do not include disks.

To protect against data loss, storage devices often include error detection and correction mechanisms. Often these mechanisms take the form of error correcting codes, which are generated by the devices and stored within the devices themselves. In addition, distributed storage systems may also utilize decentralized algorithms to distribute data among a collection of storage devices. These algorithms may also include error detection and correction algorithms such as RAID type algorithms (e.g., RAID5 and RAID6). Although data protection is offered, latencies are added for servicing received input/output (I/O) requests from multiple clients. For example, the RAID type algorithms include data reconstruction steps prior to performing steps for the received request. Therefore, performance is reduced until failures are fully recovered.

In view of the above, systems and methods for efficiently distributing data among multiple storage devices are desired.

SUMMARY OF THE INVENTION

Various embodiments of a computer system and methods for efficiently distributing data among multiple storage devices are disclosed.

In various embodiments, a computer system includes multiple client computers that send read and write requests over a network to one or more data storage arrays. The data storage array includes multiple storage devices, each with multiple allocation units (AUs). The AU is a basic unit of storage in the storage device. A size of an AU is chosen to provide both sufficiently large sized units and a relatively low number of units to reduce overhead tracking of the AUs. Each AU includes multiple data storage locations. In various embodiments, the data storage locations are referred to as pages.

In various embodiments, the storage devices are configured in a redundant array of independent drives (RAID) arrangement for data storage and protection. The data storage subsystem further comprises a data storage controller that determines the RAID layout for use in storing data. In response to determining a failure of a first AU, the storage controller begins reconstructing or rebuilding the data stored in the first AU in a second AU. During the reconstruction, read and write requests targeting a given portion (e.g., a page) in the first AU, an attempt is made to service the request using the first AU. In some embodiments, the second AU is simultaneously accessed with the first AU. In such cases, the request may be serviced by the AU that responds first. In various embodiments, the second AU is accessed after an error or a miss occurs in the first AU for the targeted page.

These and other embodiments will become apparent upon consideration of the following description and accompanying drawings.

Figure 1:
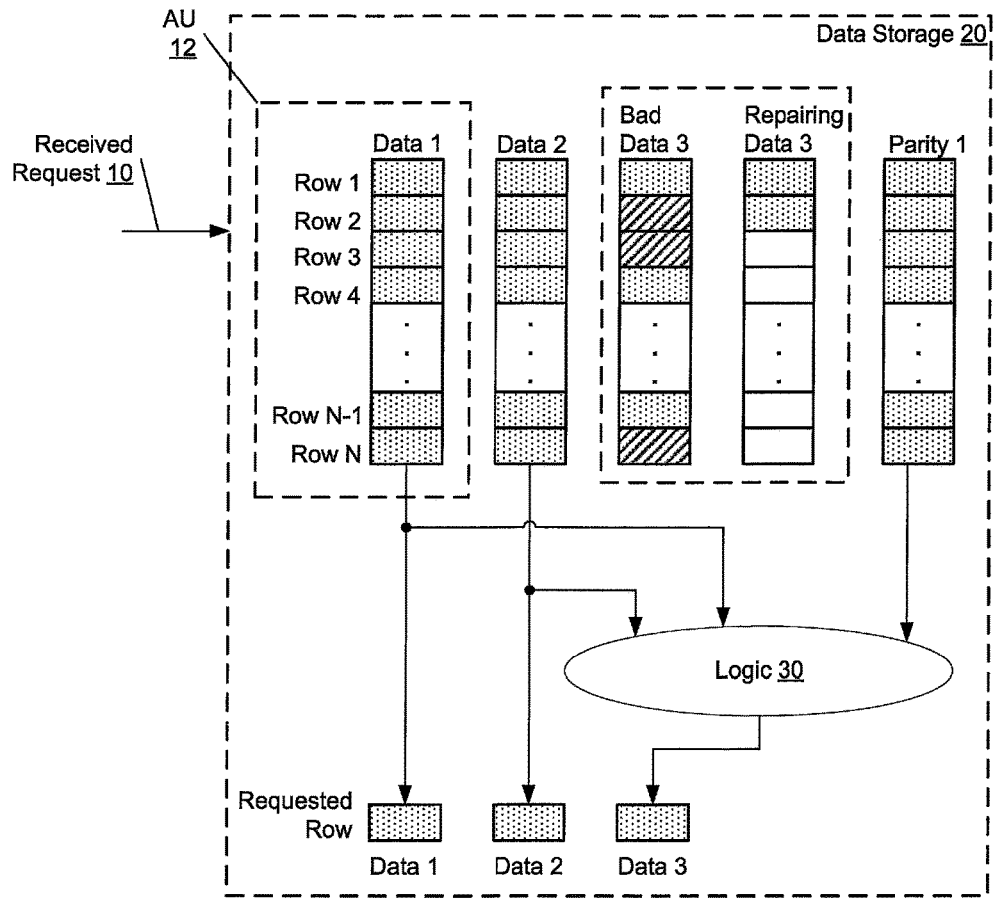
FIG. 1 is a generalized block diagram of one embodiment of handling requests in a storage subsystem with a failed region of storage.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of handling requests in a storage subsystem with a failed region of storage is shown. The data storage 20 receives read and write requests 10 from multiple client computers (not shown). The data storage 20 includes multiple storage devices, which are not shown for ease of illustration. Each of the storage devices includes multiple allocation units (AUs) such as AU 12. Some of the AUs among the storage devices are shown in the illustrated example as Data 1, Data 2, Bad Data 3, Repairing Data 3, and Parity 1.

The AU is a basic unit of storage in a storage device. A size of an AU is chosen to provide both sufficiently large sized units and a relatively low number of units to reduce overhead tracking of the AUs. Each of the Data 1, Data 2, Bad Data 3, Repairing Data 3, and Parity 1 represents an AU. A redundant array of independent drives (RAID) arrangement is used for data storage and protection on the shown AUs. Although three data allocation units with a single parity is shown for data storage and protection, other numbers of allocation units and other parity schemes are possible and contemplated.

The data layout being shown is a logical representation. In some examples, the physical arrangement of the stored data may be a random access arrangement, such as used for solid-state devices. In some examples, each of the AUs shown is located on a separate storage device within the data storage 20. In other examples, two or more of the AUs are located on a same storage device.

Each AU includes multiple data storage locations. As shown, each of the AUs includes N storage locations, wherein N is an integer. The storage locations are logically arranged as rows. In some examples, each storage location is a page, such as a 4 kilo-byte (KB) storage space. The data stored in each of the storage locations in a given AU may be associated with data 22 in a free or unallocated location, data 24 in an allocated and valid location, or with data 26 in an allocated and invalid location. The data 26 may be associated with stored data where accesses result in a miss or an error. The particular storage location may be located in a problematic region on a storage device. For example, the region may be overused, may be relatively old, may include fabrication defects and so forth. In various embodiments, in response to detection of errors to one or more portions of an AU, the storage system may be configured to relocate all of the data within the AU to a new AU. In various embodiments, the AU detected to have errors may or may not be removed from further use. In some embodiments, a decision may be made to move data from one AU to another that is not directly based on detection of an error. The methods and mechanisms described herein are applicable regardless of the reasons data is being moved to a new AU.

Control logic within a data storage controller (not shown) may have determined the allocation unit Bad Data 3 satisfies one or more conditions for having an AU state of bad, invalid, failed, or a similar state. The conditions may include at least one miss or one error occurred for an access for a storage location in the allocation unit, a number of misses or errors occurred for accesses to a same storage location in the allocation unit exceeding a threshold, a number of misses or errors occurred for accesses for any storage location in the allocation unit exceeding a threshold, and a miss rate or an error rate for accesses for any storage location in the allocation unit exceeding a threshold. The storage controller selected an unallocated or free AU to replace the allocation unit Bad Data 3. The replacement allocation unit Repairing Data 3 may be located on a different storage device. Alternatively, the replacement allocation unit Repairing Data 3 may be located on a same storage device but in a different region of memory on the same storage device.

Using the RAID layout, the storage controller initiates reconstruction of data stored in the allocation unit Bad Data 3 to the replacement allocation unit Repairing Data 3. For example, data stored in row 2 and in the allocation units Data 1 and Data 2 in addition to data stored in row 2 and in the allocation unit Parity 1 are used to reconstruct the data stored in row 2 and in allocation unit Bad Data 3. The reconstructed data is stored in row 2 in the allocation unit Repairing Data 3. Again, the data storage is shown as a logical representation of the data stored among the allocation units on the multiple storage devices.

As the rebuilding or reconstructing occurs for the data stored on the allocation unit Bad Data 3, requests are concurrently serviced. As shown, each of the allocation unit Bad Data 3 and Repairing Data 3 is not used for servicing requests. Rather, the RAID layout is used to reconstruct data used for the requests. In the example shown, the control logic 30 performs the reconstruction of data using the data read from a requested row in each of the allocation units Data 1, Data 2 and Parity 1. Therefore, each request includes an added latency for the reconstruction of data.

Figure 2:
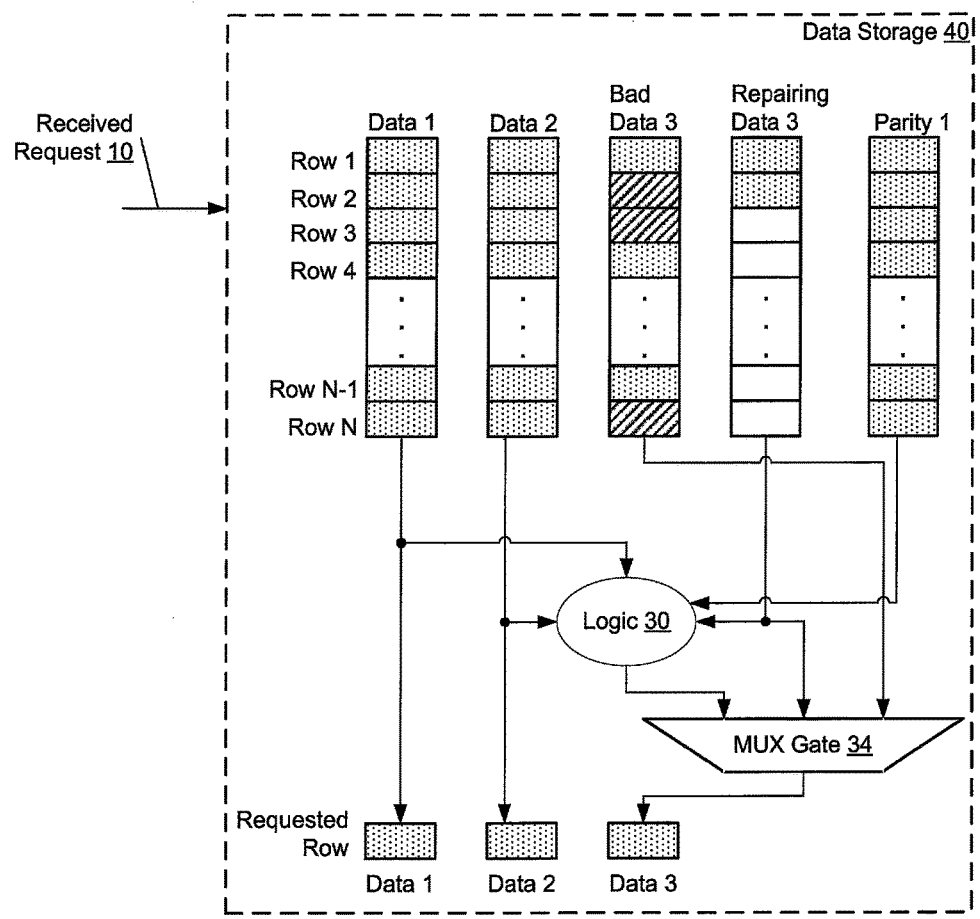
FIG. 2 is a generalized block diagram of another embodiment of handling requests in a storage subsystem with a failed region of storage.
Figure 2:
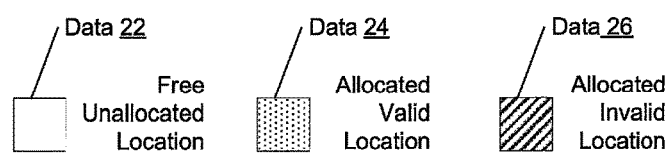

Turning now to FIG. 2, a generalized block diagram of another embodiment of handling requests in a storage subsystem with a failed region of storage is shown. Similar to the data storage 20, the data storage 40 receives read and write requests 10. The data storage 40 includes the allocation units and logic 30 shown earlier for data storage 20. However, the data storage 40 also includes a multiplexer 34. Additionally, control logic 30 is depicted that is configured to reconstruct data as will be described below. It is to be understood that the multiplexor 34 and control logic 30 are depicted as such for purposes of discussion. Those skilled in the art will appreciate that the functions performed by the multiplexor and control logic 30 may be achieved in any of a variety of ways using hardware and/or software. In the example shown, the allocation unit Repairing Data 3 is used to store reconstructed data in order to restore the data originally stored in the allocation unit Bad Data 3. Therefore, detection of failure for the allocation unit Bad Data 3 has already occurred. As the rebuilding occurs for the data stored on the allocation unit Bad Data 3, received requests are concurrently serviced. However, in some embodiments, an attempt to service a read directed to Bad Data 3 is first made using the allocation units Bad Data 3 and Repairing Data 3, rather than simply waiting for rebuilt data using the allocations units Data 1, Data 2 and Parity 1.

The multiplexer 34 receives data stored in locations of a requested row from each of the allocation units Bad Data 3, Repairing Data 3 and Parity 1. In addition, logic 30 receives data from Data 1, Data 2, and Parity 1 that can be used to reconstruct data of Bad Data 3. In some embodiments, the allocation unit Repairing Data 3 is only accessed if an access of the allocation unit Bad Data 3 is not successful. For example, the data in row 2 may be targeted by a read request. The storage location at row 2 in the allocation unit Bad Data 3 may be accessed and result in an error. Although it was already determined that the allocation unit Bad Data 3 fails and needs reconstruction of data stored at another location, the allocation unit Bad Data 3 is still accessed for servicing requests. While an access to a particular row may result in an error, there may be rows within the allocation unit Bad Data 3 that do not fail for accesses. Therefore, the allocation unit Bad Data 3 is accessed. If this access fails, the storage location at row 2 in the allocation unit Repairing Data 3 may be accessed. If the data has been reconstructed and stored in the allocation unit Repairing Data 3, then the data may be selected by the multiplexer 32.

Similarly, the data in row 4 may be targeted by a read request. The storage location at row 4 in the allocation unit Bad Data 3 may be accessed and result in an error-free hit. Again, although it was already determined that the allocation unit Bad Data 3 fails and needs reconstruction of data performed and stored at another location, the allocation unit Bad Data 3 is still accessed for servicing requests. The data in the storage location in row 4 in the allocation unit Bad Data 3 may be selected by the multiplexer 34. In various embodiments, the data stored in the allocation units Bad Data 3 and Repairing Data 3 are simultaneously accessed. In some embodiments, the data in the storage location in row 4 in the allocation unit Bad Data 3 may be copied to row 4 of the allocation unit Repairing Data 3, rather than have the data reconstructed and stored in row 4 of the allocation unit Repairing Data 3. In various embodiments, an attempt may be made to copy as many portions of a failed AU as possible to a new location before reconstruction is performed.

In various embodiments, the control logic 30 performs reconstruction of data according to the RAID layout. The multiplexer 34 selects between the output of the logic 30 and the output of the multiplexer 32. For a read request resulting in an access hit in the allocation unit Bad Data 3, the resulting data in the storage location of the allocation unit Bad Data 3 is sent through the multiplexer 34. For a read request resulting in an access miss or error in the allocation unit Bad Data 3, but an access hit in the allocation unit Repairing Data 3, the resulting data in the storage location of the allocation unit Repairing Data 3 is sent through the multiplexer 34. In various embodiments, logic 30 may begin reconstruction of data simultaneously with accesses to Bad Data 3 and Repairing Data 3. Whichever successfully completes first is then selected for servicing the read (e.g., using a multiplexor 34 type mechanism). Any suitable combination of the ordering of accesses to each of Bad Data 3, Repairing Data 3, and reconstructed data using logic 30, are possible and are contemplated. Some may precede others, while others are concurrent, etc.

As seen in the above, valid data stored in either of the allocation units Bad Data 3 and Repairing Data 3 may be read out to service the read request with no added latency normally associated with reconstructing data. Similar steps may be used and simply modified for write requests for particular technologies used within the storage devices. For example, storage devices using solid-state technology, such as Flash memory, may only use the above steps for read requests as write requests are always sent to different physical storage locations.

Figure 3:
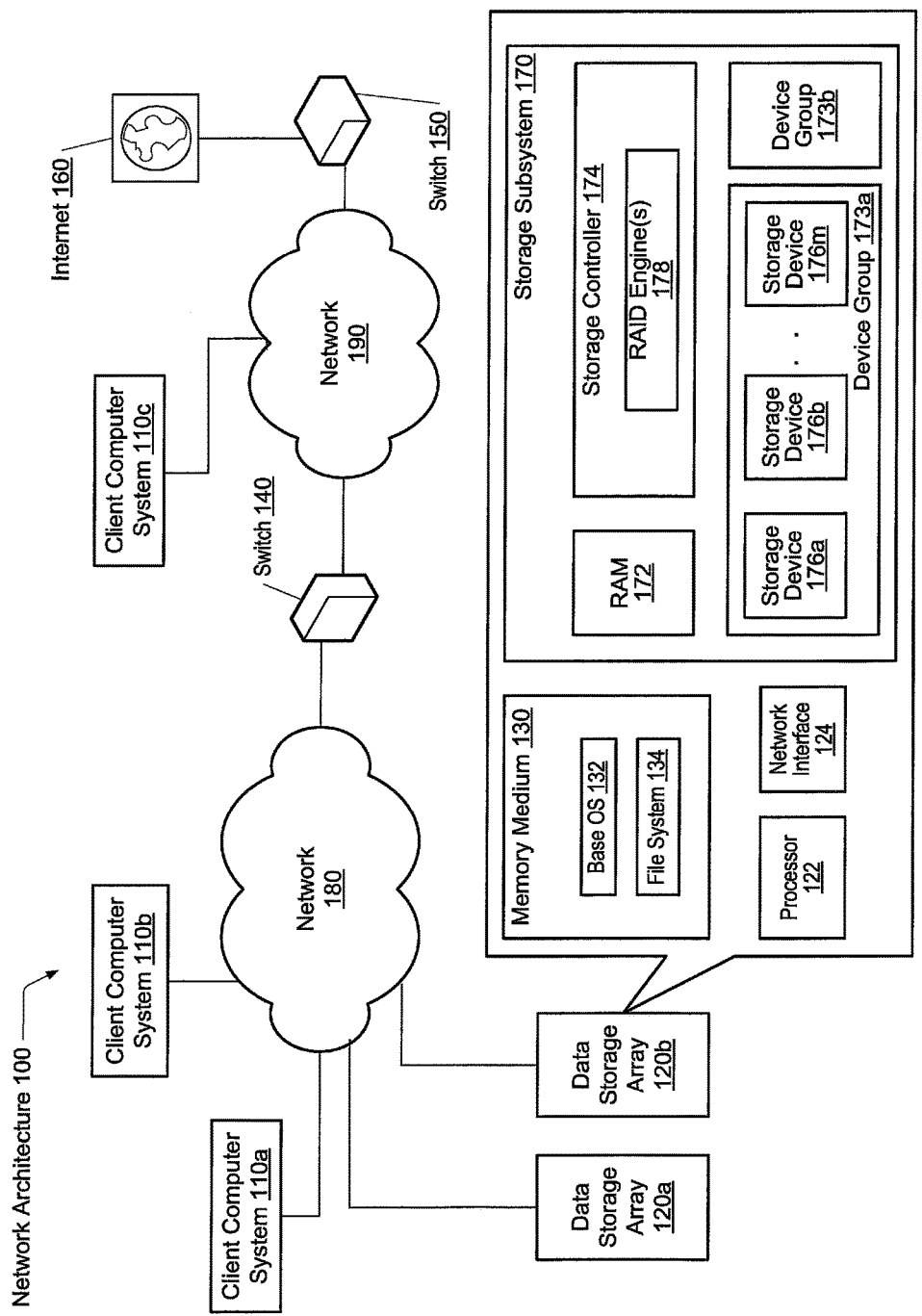
FIG. 3 is a generalized block diagram illustrating one embodiment of a network architecture.

Referring to FIG. 3, a generalized block diagram of one embodiment of a network architecture 100 is shown. As described further below, one embodiment of network architecture 100 includes client computer systems 110*a*-110*b* interconnected to one another through a network 180 and to data storage arrays 120*a*-120*b*. Network 180 may be coupled to a second network 190 through a switch 140. Client computer system 110*c* is coupled to client computer systems 110*a*-110*b* and data storage arrays 120*a*-120*b* via network 190. In addition, network 190 may be coupled to the Internet 160 or otherwise outside network through switch 150.

It is noted that in alternative embodiments, the number and type of client computers and servers, switches, networks, data storage arrays, and data storage devices is not limited to those shown in FIG. 3. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 3 is provided shortly. First, an overview of some of the features provided by the data storage arrays 120*a*-120*b* is described.

In the network architecture 100, each of the data storage arrays 120*a*-120*b* may be used for the sharing of data among different servers and computers, such as client computer systems 110*a*-110*c*. In addition, the data storage arrays 120*a*-120*b* may be used for disk mirroring, backup and restore, archival and retrieval of archived data, and data migration from one storage device to another. In an alternate embodiment, one or more client computer systems 110*a*-110*c* may be linked to one another through fast local area networks (LANs) in order to form a cluster. Such clients may share a storage resource, such as a cluster shared volume residing within one of data storage arrays 120*a*-120*b*.

Each of the data storage arrays 120*a*-120*b* includes a storage subsystem 170 for data storage. Storage subsystem 170 may comprise one or more storage devices 176*a*-176*m*. These storage devices 176*a*-176*m* may provide data storage services to client computer systems 110*a*-110*c*. Each of the storage devices 176*a*-176*m* uses a particular technology and mechanism for performing data storage. The type of technology and mechanism used within each of the storage devices 176*a*-176*m* may at least in part be used to determine the algorithms used for controlling and scheduling read and write operations to and from each of the storage devices 176*a*-176*m*. For example, the algorithms may locate particular physical locations corresponding to the operations. In addition, the algorithms may perform input/output (I/O) redirection for the operations, removal of duplicate data in the storage subsystem 170, and support one or more mapping tables used for address redirection and deduplication.

The logic used in the above algorithms may be included in one or more of a base operating system (OS) 132, a volume manager 134, within the storage subsystem controller 174, control logic within each of the storage devices 176*a*-176*m*, or otherwise. Additionally, the logic, algorithms, and control mechanisms described herein may comprise hardware and/or software.

Each of the storage devices 176*a*-176*m* may be configured to receive read and write requests and comprise a plurality of data storage locations, each data storage location being addressable as rows and columns in an array. In one embodiment, the data storage locations within the storage devices 176*a*-176*m* may be arranged into logical, redundant storage containers or RAID arrays (redundant arrays of inexpensive/independent disks).

In some embodiments, each of the storage devices 176*a*-176*m* may include or be further coupled to storage consisting of solid-state memory to store persistent data. In one embodiment, the included solid-state memory comprises solid-state drive (SSD) technology. A Solid-State Disk (SSD) may also be referred to as a Solid-State Drive.

Storage array efficiency may be improved by creating a storage virtualization layer between user storage and physical locations within storage devices 176*a*-176*m*. In one embodiment, a virtual layer of a volume manager is placed in a device-driver stack of an operating system (OS), rather than within storage devices or in a network. A volume manager or a disk array manager is used to support device groups 173*a*-173*m*.

In one embodiment, one or more mapping tables may be stored in the storage devices 176*a*-176*m*, rather than memory, such as RAM 172, memory medium 130 or a cache within processor 122. The storage devices 176*a*-176 may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

Network architecture 100 includes client computer systems 110*a*-110*c* interconnected through networks 180 and 190 to one another and to data storage arrays 120*a*-120*b*. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110*a*-110*c* are representative of any number of stationary or mobile computers such as desktop personal computers (PCs), servers, server farms, workstations, laptops, handheld computers, servers, personal digital assistants (PDAs), smart phones, and so forth. Each of the client computer systems 110*a*-110*c* may include a hypervisor used to support virtual machines (VMs).

Each of the data storage arrays 120*a*-120*b* may be used for the sharing of data among different servers, such as the client computer systems 110*a*-110*c*. Each of the data storage arrays 120*a*-120*b* includes a storage subsystem 170 for data storage. Storage subsystem 170 may comprise one or more storage devices 176*a*-176*m*. Each of these storage devices 176*a*-176*m* may be an SSD. A random-access memory (RAM) 172 may be used to batch operations, such as received write requests. In various embodiments, when batching write operations (or other operations) non-volatile storage (e.g., NVRAM) may be used. The controller 174 may comprise logic for handling received read/write requests. The controller 174 may also include the RAID engine 178 to determine data layout among the devices 176*a*-176*m* and to add protection for the stored data.

The base OS 132, the volume manager 134 (or disk array manager 134), any OS drivers (not shown) and other software stored in memory medium 130 may provide functionality providing access to files and the management of these functionalities. The base OS 132 and the OS drivers may comprise program instructions stored on the memory medium 130 and executable by processor 122 to perform one or more memory access operations in storage subsystem 170 that correspond to received requests. Each of the data storage arrays 120*a*-120*b* may use a network interface 124 to connect to network 180. Similar to client computer systems 110*a*-110*c*, in one embodiment, the functionality of network interface 124 may be included on a network adapter card.

In addition to the above, the storage controllers 174 within the data storage arrays 120*a*-120*b* may support storage array functions such as snapshots, replication and high availability. In addition, the storage controller 174 may support a virtual machine environment that comprises a plurality of volumes with each volume including a plurality of snapshots. In one example, the storage controller 174 may support hundreds of thousands of volumes, wherein each volume includes thousands of snapshots. In one embodiment, a volume may be mapped in fixed-size sectors, such as a 4-kilobyte (KB) page within storage devices 176*a*-176*m*. In another embodiment, a volume may be mapped in variable-size sectors such as for write requests. A volume ID, a snapshot ID, and a sector number may be used to identify a given volume.

Figure 4:
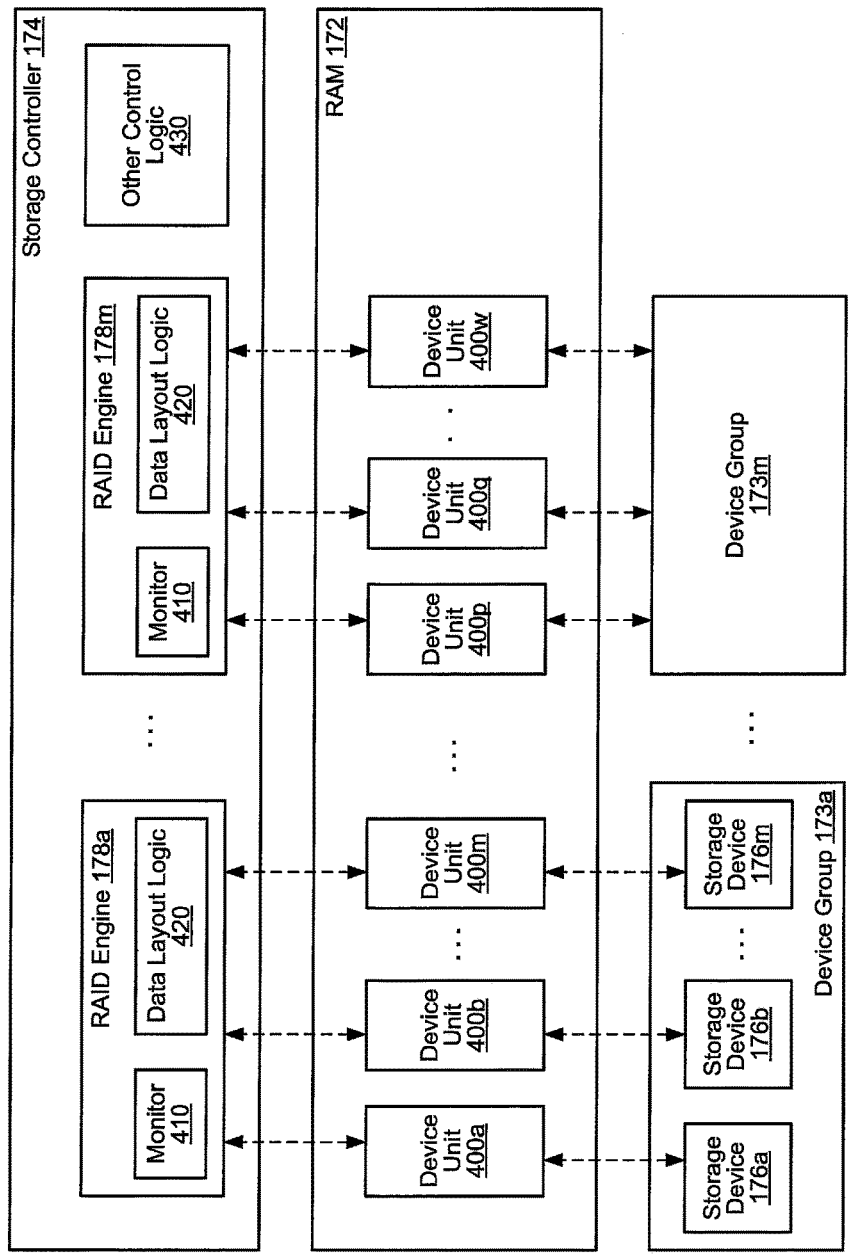
FIG. 4 is a generalized block diagram of one embodiment of a storage subsystem.

Turning now to FIG. 4, a generalized block diagram of one embodiment of a storage subsystem is shown. Each of the one or more storage devices 176*a*-176*m* may be partitioned in one of one or more device groups 173*a*-173*m*. Other device groups with other devices may be present as well. One or more corresponding operation queues and status tables for each storage device may be included in one of the device units 400*a*-400*w*. These device units may be stored in RAM 172. A corresponding RAID engine 178*a*-178*m* may be included for each one of the device groups 173*a*-173*m*. Each one of the RAID engines 178*a*-178*m* may include a monitor 410 that tracks statistics for each of the storage devices included within a corresponding device group. Data layout logic 420 may determine an amount of space to allocate within a corresponding storage device for user data, inter-device redundancy data and intra-device redundancy data. The storage controller 174 may comprise other control logic 430 to perform at least one of the following tasks: wear leveling, garbage collection, I/O scheduling, deduplication and protocol conversion for incoming and outgoing packets.

Figure 5:
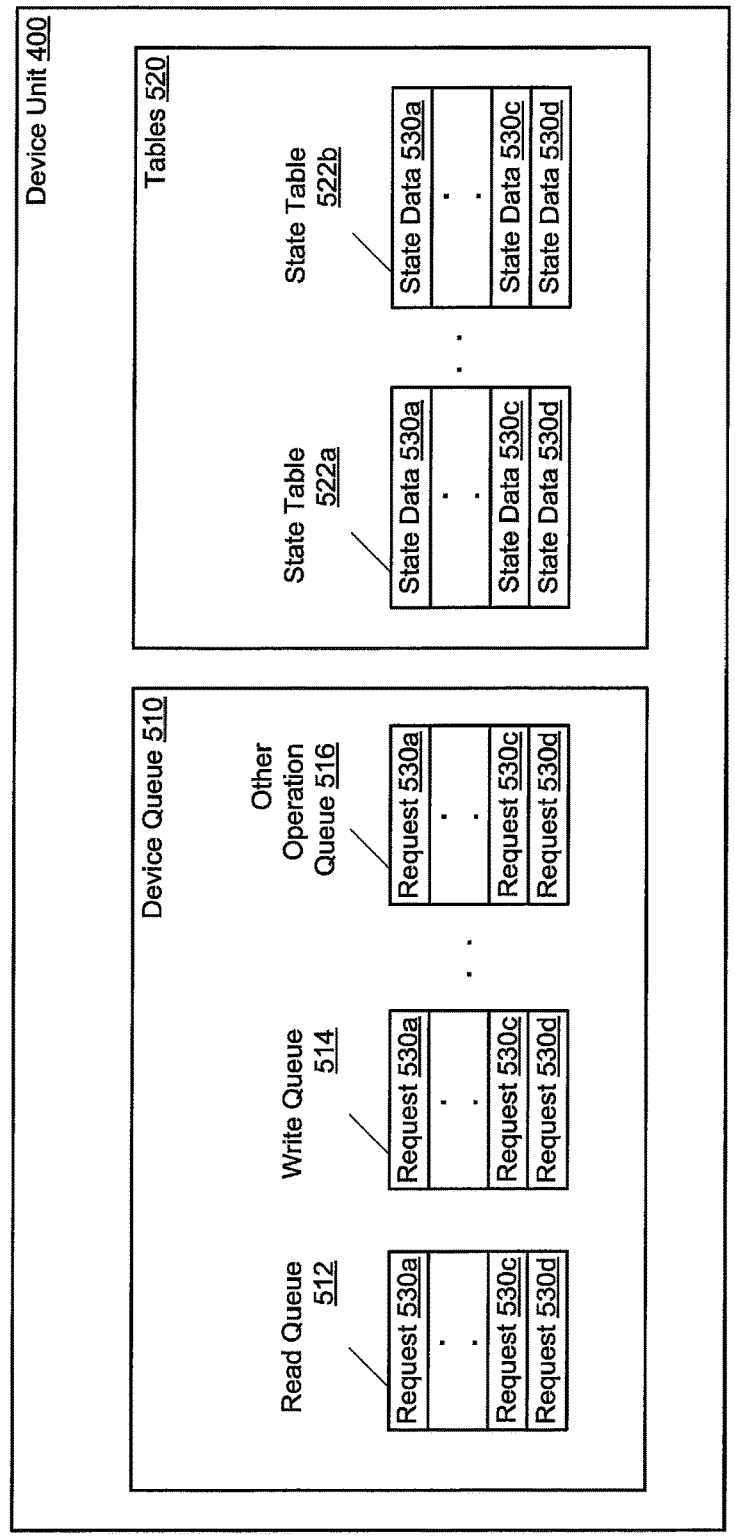
FIG. 5 is a generalized block diagram of one embodiment of a device unit.

Turning now to FIG. 5, a generalized block diagram of one embodiment of a device unit is shown. A device unit may comprise a device queue 510 and tables 520. Device queue 510 may include a read queue 512, a write queue 514 and one or more other queues such as other operation queue 516. Each queue may comprise a plurality of entries for storing one or more corresponding requests 530*a*-530*d*. For example, a device unit for a corresponding SSD may include queues to store at least read requests, write requests, trim requests, erase requests and so forth.

Tables 520 may comprise one or more state tables 522*a*-522*b*, each comprising a plurality of entries for storing state data, or statistics, 530. It is also noted that while the queues and tables are shown to include a particular number of entries in this and other figures, the entries themselves do not necessarily correspond to one another. Additionally, the number of queues, tables, and entries may vary from that shown in the figure and may differ from one another.

Figure 6:
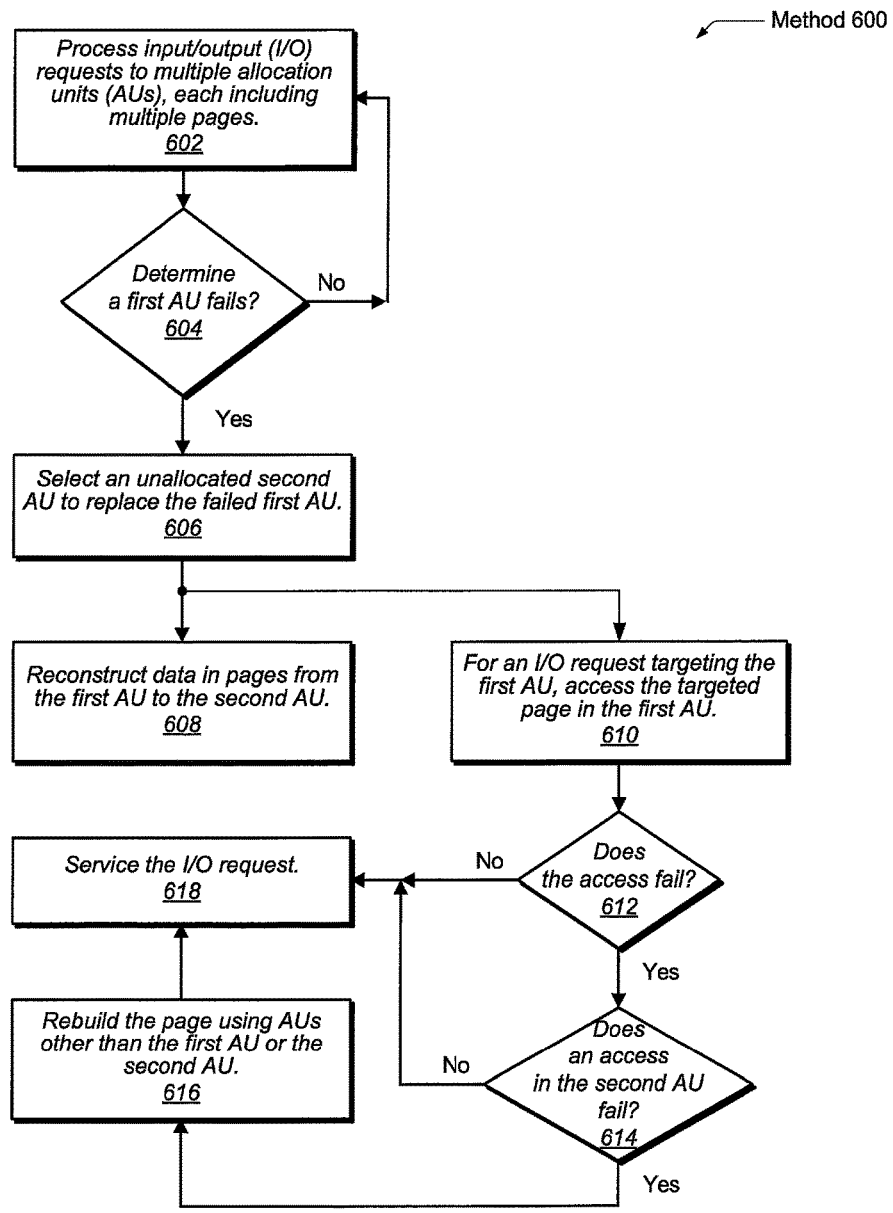
FIG. 6 is a generalized flow diagram illustrating one embodiment of a method for handling requests in a storage subsystem with a failed region of storage.

Turning now to FIG. 6, a generalized flow diagram of one embodiment of a method 600 for handling requests in a storage subsystem with a failed region of storage is shown. For purposes of discussion, the steps in this embodiment are shown in sequential order. However, some steps may occur in a different order than shown, some steps may be performed concurrently, some steps may be combined with other steps, and some steps may be absent in another embodiment. For example, as discussed above, simultaneous accesses may be made to a failed AU and an AU selected to replace the failed AU. Additionally, reconstruction could begin at the same time as such accesses. All such possible combinations discussed above are contemplated.

Responsive to receiving input/output (I/O) requests, such as read and write requests, to multiple allocation units (AUs) within one or more storage devices, the I/O requests are processed (block 602). Each of the AUs includes multiple pages. In some embodiments, each page is an allocation space that is the smallest allocation size to access for an I/O request. In some examples, the page may be a 4 KB storage space in an AU. The read requests have requested data returned to a requesting client computer, such as one or more targeted pages within a specified AU. Additionally, the write requests have request data written to a targeted storage location, such as one or more pages within an AU.

A given AU may be determined to fail based on multiple conditions. As described earlier, the conditions may include at least one miss or one error occurred for an access for a storage location in the given AU, a number of misses or errors occurred for accesses to a same storage location in the given AU exceeding a threshold, a number of misses or errors occurred for accesses for any storage location in the given AU exceeding a threshold, and a miss rate or an error rate for accesses for any storage location in the given AU exceeding a threshold. Alternatively, an AU may simply be selected to have its data relocated to another AU for any another reason.

If it is determined a first AU fails (conditional block 604), then in block 606, an unallocated second AU is selected to replace the failed first AU. To reconstruct the data originally stored in the first AU, the data may be reconstructed using a supported RAID layout and stored in the second AU. The data originally stored in the pages of the first AU are reconstructed in the second AU (block 608).

For an I/O request targeting the first AU while the AU is being replaced, the targeted page is accessed in the first AU (block 610). If the access in the first AU fails (conditional block 612), and an access for the same page in the second AU fails (conditional block 614), then in block 616, the requested page is reconstructed or rebuilt using AUs other than the first AU or the second AU. For example, a RAID layout with one or more parity pages may be used to reconstruct the requested page. In block 618, the I/O request is serviced. For example, the reconstructed data is sent to a requesting client computer. As already discussed, multiple approaches to obtaining data to service a read request may be attempted simultaneously. In such embodiments, the first approach to successfully obtain the data or otherwise have it ready is used to service the read.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a data storage subsystem configured to receive read and write requests, wherein the subsystem comprises a plurality of allocation units (AUs), each AU comprising a plurality of data storage locations; and
a data storage controller;
in response to detecting a failure of a first AU of the plurality of AUs, the storage controller is configured to:
select an unallocated second AU as a replacement for the first AU; and
initiate reconstruction of data stored in the first AU to the second AU; and
in response to receiving a read or write request targeting a given data storage location in the first AU during said reconstruction, the storage controller is configured to:
simultaneously access the first AU and the second AU in order to service the read or write request;
identify which of the first AU and the second AU responds first with the requested data in response to simultaneously accessing the first AU and the second AU; and
service the received read or write requests with the requested data from the identified AU that responds first with the requested data.

2. The computer system as recited in claim 1, wherein in response to determining data has not yet been reconstructed in the given data storage location in the second AU, the data storage controller is further configured to copy data from the given data storage location in the first AU to the given data storage location in the second AU.

3. The computer system as recited in claim 1, wherein the data storage controller is further configured to service the received read or write request using the second AU responsive to determining an error occurs when accessing the given data storage location in the first AU.

4. The computer system as recited in claim 3, wherein the data storage controller is further configured to use reconstructed data to both service the received read or write request and store data in the given data storage location in the second AU responsive to determining an error occurs when accessing the given data storage location in the first AU.

5. The computer system as recited in claim 1, wherein detecting the failure of the first AU comprises determining a number of errors when accessing data in the first AU exceeds a threshold.

6. The computer system as recited in claim 1, wherein the data storage subsystem further comprises a plurality of storage devices, wherein the first AU and the second AU are located on different storage devices.

7. A method for use in a computer system, the method comprising:
receiving read and write requests at a data storage subsystem, wherein the subsystem comprises a plurality of allocation units (AUs), each AU comprising a plurality of data storage locations;
in response to detecting a failure of a first AU of the plurality of AUs:
selecting an unallocated second AU as a replacement for the first AU; and
initiating reconstruction of data stored in the first AU to the second AU; and in response to receiving a read or write request targeting a given data storage location in the first AU during said reconstruction:
    simultaneously accessing the first AU and the second AU in order to service the read or write request;
    identifying which of the first AU and the second AU responds first with the requested data in response to simultaneously accessing the first AU and the second AU; and
    servicing the received read or write requests with the requested data from the identified AU that responds first with the requested data.

8. The method as recited in claim 7, wherein in response to determining data has not yet been reconstruction in the given data storage location in the second AU, the method further comprises copying data from the given data storage location in the first AU to the given data storage location in the second AU.

9. The method as recited in claim 7, further comprising servicing the received read or write request using the second AU responsive to determining an error occurs when accessing the given data storage location in the first AU.

10. The method as recited in claim 9, further comprising using reconstructed data to both service the received read or write request and store data in the given data storage location in the second AU responsive to determining an error occurs when accessing the given data storage location in the first AU.

11. The method as recited in claim 7, wherein detecting the failure of the first AU comprises determining a number of errors when accessing data in the first AU exceeds a threshold.

12. The method as recited in claim 7, wherein detecting the failure of the first AU comprises determining an error rate when accessing data in the first AU exceeds a threshold.

13. A non-transitory computer readable storage medium storing program instructions, wherein the program instructions are executable by a processor to:
    receive read and write requests at a data storage subsystem, wherein the subsystem comprises a plurality of allocation units (AUs), each AU comprising a plurality of data storage locations;
    in response to detecting a failure of a first AU of the plurality of AUs:
        select an unallocated second AU as a replacement for the first AU;
        initiate reconstruction of data stored in the first AU to the second AU;
    in response to receiving a read or write request targeting a given data storage location in the first AU during said reconstruction:
        simultaneously access the first AU and the second AU in order to service the read or write request;
        identify which of the first AU and the second AU responds first with the requested data in response to simultaneously accessing the first AU and the second AU; and
        service the received read or write requests with the requested data from the identified AU that responds first with the requested data.

14. The non-transitory computer readable storage medium as recited in claim 13, wherein in response to determining data has not yet been reconstructed in the given data storage location in the second AU, the program instructions are further executable by a processor to copy data from the given data storage location in the first AU to the given data storage location in the second AU.

15. The non-transitory computer readable storage medium as recited in claim 13, wherein the program instructions are further executable by a processor to service the received read or write request using the second AU responsive to determining an error occurs when accessing the given data storage location in the first AU.

* * * * *